United States Patent [19]

Wambeke et al.

[11] Patent Number: 5,741,014
[45] Date of Patent: Apr. 21, 1998

[54] DUCT SEALING

[75] Inventors: Alain Wambeke, Zoutleeuw; Jean-Pierre Wandels, Lubbeek, both of Belgium

[73] Assignee: N.V. Raychem S.A., Kessel-Lo, Belgium

[21] Appl. No.: 528,088

[22] Filed: Sep. 14, 1995

[30] Foreign Application Priority Data

Sep. 14, 1994 [GB] United Kingdom ............ 9418516
May 31, 1995 [GB] United Kingdom ............ 9510956

[51] Int. Cl.⁶ ............................ F16J 15/46; H02G 15/02
[52] U.S. Cl. ........................... 277/1; 277/11; 277/227; 174/77 R
[58] Field of Search ................... 277/1, 11, 166, 277/189, 227; 52/220.8, 2.13, 101; 285/97; 138/93, 89, 108; 174/96, 99 R, 99 E, 77 R, 76, 23 R

[56] References Cited

U.S. PATENT DOCUMENTS

| | | | |
|---|---|---|---|
| 3,758,916 | 9/1973 | Wetmore | 174/77 R |
| 3,948,291 | 4/1976 | Persson | 138/108 |
| 4,093,818 | 6/1978 | Thwaites et al. | 138/108 |
| 4,114,974 | 9/1978 | Lawrence | 339/103 C |
| 4,237,667 | 12/1980 | Pallucci et al. | 52/220.8 |
| 4,330,136 | 5/1982 | Henson | 277/228 |
| 4,424,867 | 1/1984 | Mallow | 52/220.8 |
| 4,622,436 | 11/1986 | Kinnan | 277/1 |
| 4,886,939 | 12/1989 | Kinnan | 174/99 R |

FOREIGN PATENT DOCUMENTS

| | | | |
|---|---|---|---|
| 0395659 | 12/1965 | Switzerland | 277/11 |
| 1 335 774 | 10/1973 | United Kingdom | F16L 13/10 |
| WO 89/00264 | 1/1989 | WIPO | F16L 55/10 |
| WO 92/19034 | 10/1992 | WIPO | H02G 15/013 |
| WO 93/03302 | 2/1993 | WIPO | F16L 5/02 |

Primary Examiner—William A. Cuchlinski, Jr.
Assistant Examiner—John L. Beres
Attorney, Agent, or Firm—Herbert G. Burkard

[57] ABSTRACT

A kit of parts for closing an end of a duct having a polygonal internal cross-section comprises: (a) a sealing member that can be inserted into the duct to form a seal therewith; and (b) a device that can be inserted into the duct to provide sealing material therein, comprising a support and sealing material located on the support. The device is shaped such that at least some of the sealing material of the device is located at the corners of a polygon, to form a seal, in use, between the sealing member and an internal surface of the duct at each corner of the polygonal internal cross-section thereof.

15 Claims, 5 Drawing Sheets

DUCT SEALING

BACKGROUND OF THE INVENTION

1. Field of the Invention

The present invention relates to a kit of parts, a device and a method for closing an end of a duct. The term 'duct' as used in this specification includes not only elongate hollow articles for providing passages through walls, bulkheads or the like, but also articles such as cable or pipe enclosures, and particularly cable splice closure housings.

2. Introduction to the Invention

Ducts often need to be sealed, for example to prevent the passage of fluids, e.g. water, along them. For example, cables, pipes or other elongate objects may be installed underground in ducts which extend between manholes, the manholes providing access to the elongate objects, and it is generally desirable to prevent the manholes from filling up with water. Seals are therefore often provided to close the space (e.g. an annular space) between one or more cables, pipes etc. carried by a duct and the internal surface of the duct and/or to close an empty duct, in order to prevent water flowing along the duct and into the manhole. Another use for duct seals is to close ducts extending through walls or bulkheads (such duct seals are often termed 'feedthroughs').

Most ducts have a round, e.g. generally circular, cross-section, and consequently most duct seals are designed primarily for closing round ducts. One highly successful seal is that disclosed in International Patent Application No. WO 92/19034 (Raychem), which comprises a flexible hollow sealing member that can be inflated to seal a gap between first and second articles (e.g. between a duct and one or more cables extending through the duct). The sealing member has a hole directly through a wall or between walls thereof through which hole a probe can be inserted to introduce a pressurizing medium into the member, and means by which the hole is automatically sealed on withdrawal of the probe. The entire disclosure of WO 92/19034 is incorporated herein by reference.

International Patent Application No. WO 93/03302 (Raychem) discloses a kit of parts for forming a duct seal, particularly in a duct having a non-uniform cross-section, e.g. which has an internal longitudinally extending protrusion. The kit comprises a device that can be positioned within a duct for locating sealing material at a localized portion of an inner surface of the duct, and a sealing member that can at least partially block a cross-section of the duct such that the sealing material forms a seal between a portion of the duct and a portion of the sealing member.

Both of the above sealing systems are designed primarily for sealing ducts which are circular in cross-section. However, some ducts are polygonal, e.g. square, in cross-section. By 'polygonal' in cross-section is meant that the internal cross-section of the duct has a shape corresponding generally to a polygon, i.e. a closed figure comprising generally straight lines joined end to end. The polygon need not necessarily be a regular polygon, but in practice it normally will be, and may, for example, be triangular, square, rectangular, pentagonal, hexagonal, heptagonal or octahedral. The most common form of polygonal duct is generally square in cross-section. The internal corners of the duct may be formed by the meeting of planar surfaces of the duct, or, more commonly, they may be smoothed, e.g. radiussed (rounded).

Ducts which are square in cross-section are conventionally sealed by means of polyurethane foam. Such a sealing method, however, often does not reliably seal ducts against running water.

SUMMARY OF THE INVENTION

We have now invented a device and a kit of parts (the kit including the device) for closing a duct having a polygonal internal cross-section. In particular, the device advantageously enables a sealing member which is primarily designed for sealing a duct with a round internal cross-section to form a seal in a duct having a polygonal internal cross-section, by locating sealing material in the internal corners of the duct. The device generally cooperates with the sealing member to supplement the seal provided by the sealing member and/or to enhance the effectiveness of the closure of the duct. By means of the device and the kit, ducts with a polygonal internal cross-section can normally be sealed reliably, e.g. against running water.

According to a first aspect of the invention, there is provided a device for providing sealing material inside a duct having a polygonal internal cross-section, comprising a support and sealing material located on the support, the device being shaped such that at least some of the sealing material of the device is located at the corners of a polygon, in order that when the device is inserted into the duct in use, at least some of the sealing material is located at each corner of the polygonal internal cross-section thereof.

According to a second aspect of the invention, there is provided a kit of parts for closing an end of a duct having a polygonal internal cross-section, comprising:

(a) a sealing member that can be inserted into the duct to form a seal therewith; and (b) a device that can be inserted into the duct to provide sealing material therein, comprising a support and sealing material located on the support;

the device being shaped such that at least some of the sealing material of the device is located at the corners of a polygon, to form a seal, in use, between the sealing member and an internal surface of the duct at each corner of the polygonal internal cross-section thereof.

It is to be understood that the preferred features of the device described herein apply both to the device according to the first aspect of the invention and to the device which is part of the kit of parts according to the second aspect of the invention.

As mentioned above, the invention has the particular advantage of enabling a sealing member which is primarily designed for sealing a duct with a round internal cross-section to form a seal in a duct having a polygonal internal cross-section. This has the advantage that it is often necessary only to supply one form of sealing member for both circular and polygonal ducts, since the device of the invention may generally be used in combination with the sealing member to enable the sealing member to close polygonal ducts. It may also have the advantage of helping the manufacturer of the sealing member to optimize the performance of the sealing member since normally only one design will be necessary. According to preferred embodiments of the kit according to the invention, the sealing member comprises an inflatable sealing member, and most preferably comprises an inflatable sealing member as disclosed in WO 92/19034. In these preferred embodiments, therefore, the device of the invention has the advantage of enabling this successful form of sealing member to be used in polygonal cross-section ducts.

The invention generally enables sealing material to be located at the corners of a polygonal cross-section duct by means of a single unitary device. This can provide a number of advantages. Firstly, it is generally easy to handle and to install the device since it is normally not necessary to handle two or more separate devices in order to locate sealing material in the corners of the duct. Secondly, the sealing material provided by the device is generally held in position (in each of the corners of the duct) securely during the installation of the sealing member and the closing of the end of the duct.

The support of the device preferably comprises a single unit which supports all of the sealing material which is located at the corners of a polygon (and which, in use, forms a seal at each corner of the duct). The support may have any of a variety of forms, but preferably the support comprises a frame, e.g which, in use, is located around the sealing member (e.g. such that it substantially surrounds the sealing member). The frame may, for example, be formed from metal and/or plastics material or generally any other suitable material. A particularly preferred form of frame is made from metal wire. Metal wire is generally relatively inexpensive and can often be formed into shape with relative ease. An especially advantageous frame comprises a single piece of wire (or other elongate article), e.g. bent to define a support which conforms to the shape of the duct.

When the support comprises a frame, the frame preferably has at least three arms which are arranged to extend, in use, longitudinally within the duct, each arm preferably arranged at the corner of a polygon and supporting sealing material which is arranged to form a seal at a respective corner of the polygonal internal cross-section of a duct. For embodiments in which the sealing material is present in discrete portions, preferably each discrete portion of sealing material is located on a respective arm of the frame.

It was stated above that the device and the kit according to the invention are for closing an end of a duct. It is normally desirable for a duct to be closed at one or both of its ends, thereby facilitating access to the seals, e.g. for maintenance work, but it is to be understood that the invention may be used to close a duct at a region between its ends. Preferably, however, the sealing member and the device of the kit are located, in use, in an end region of the duct. The device may advantageously have one or more portions which, in use, abut an end surface of the duct, thereby substantially preventing the device from moving, in use, from an end region of the duct further into the duct. Such portion(s) may, for example, comprise part of the support of the device, especially when in the form of a frame. In embodiments having a wire frame, such portions may comprise portions of the wire frame which are bent outwardly with respect to the major portion of the frame, so as to abut the end surface of the duct. Such portions may also have the advantage of providing 'handles' to facilitate removal of the device, and preferably also to facilitate removal of the sealing member.

The device according to the invention is preferably open in cross-section (e.g. open-sided) to enable it to be positioned around one or more cables, pipes or other elongate objects extending through the duct without requiring access to the end of the cables or pipes etc. The support, e.g. frame, of the device is therefore preferably open in cross-section. The support is preferably constructed to slot over one or more cables etc.

The support of the device may advantageously be resiliently compressible, thereby preferably enabling it to be inserted into, and form a tight fit with, a range of ducts having differing cross-sectional dimensions. A tight fit in a duct can have the advantage of providing resistance to so-called 'piston forces' which may act upon the sealing member and/or the device and which tend to force them along the duct either further into the duct or out of its open end. The entire support may be resiliently compressible and/or the support may have one or more resiliently compressible sections. In embodiments in which the support comprises a wire frame, such resiliently compressible sections, may, for example, comprise specially shaped sections of the wire, e.g. shaped into the form of a helical spring. Such resiliently compressible sections are preferably located in parts of the support which extend, in use, across the width, or part of the width, of the duct.

In particularly preferred embodiments of the invention, the device is adjustable to fit a range of sizes and/or shapes of duct. Advantageously, at least part of the support, e.g. frame, of the device is bendable, preferably by hand, thereby permitting the support to be bent into the correct size and/or shape for a particular duct. Preferably at least the portions of the support which extend, in use, across the width, or part of the width, of the duct have a length which is greater than the shortest distance between their ends. This has the advantage that these portions can preferably be bent such that the width of the support, and therefore the device, is increased. These portions may, for example, comprise angular, curved and/or convoluted portions. Such portions can preferably also be bent such that the width of the support, and therefore the device, is decreased.

It was stated above that the device of the invention is shaped such that at least some of the sealing material of the device is arranged at the corners of a polygon. According to a preferred embodiment of the invention, the sealing material of the device comprises at least three discrete portions, each of which is arranged at a corner of the polygon. The most common forms of polygonal ducts are those having a square or a rectangular cross-section. Preferably, therefore, the polygon has only four corners. Most preferably, the sealing material of the device comprises four discrete portions, each of which is preferably arranged at a corner of a four cornered polygon, e.g. a square or a rectangle.

The sealing material may generally comprise any suitable sealing material. A preferred sealing material comprises a mastic, most preferably having a high compression set and minimum creep properties. An advantageous property of mastic is that during the formation of a seal, it is generally able to flow easily, but after some time it is normally stable, does not creep, and has a high mechanical strength. Preferably the mastic has a softening point (when measured according to ASTM E28) of 129° C., and when subjected to a rolling drum peel test at 23° C. (according to test QAPK 027) has a peel strength of 130N/25 mm. The preferred mastic also has a sheer strength (when tested according to ISO4587) of greater than 160N preferably greater than 250N. Mastics suitable for this invention have high, generally 100%, compression set. A preferred mastic, when tested according to ASTM D 1321 needle penetration test (5 second, 50 gr) shows a needle penetration of 25–35 ($\times 10^{-1}$ mm), especially about 28 ($\times 10^{-1}$ mm), or a needle penetration of 35 to 45 ($\times 10^{-1}$ mm), especially about 40 ($\times 10^{-1}$ mm), and when tested according to ASTM D1321 needle penetration test (5 sec, 100 gr test) shows a needle penetration of 35 to 45 ($\times 10^{-1}$ mm), especially about 40 ($\times 10^{-1}$ mm), or about 55 to 65 ($\times 10^{-1}$ mm) especially about 60 ($\times 10^{-1}$ mm).

The sealing material may additionally or alternatively comprise gel. The gel may, for example, comprise silicone gel, urea gel, urethane gel, thermoplastic gel, or any suitable gel or gelloid sealing material. Preferred gels comprise an oil—extended polymer composition. Preferably the gel has a hardness at room temperature as determined using a Stevens-Volland Texture Analyser of greater than 45 g.

particularly greater than 50 g especially greater than 55 g, e.g. between 55 g and 60 g. It preferably has a stress-relaxation of less than 12%, particularly less than 10% and especially less than 8%. Ultimate elongation, also at room temperature, is preferably greater than 600%, especially greater than 1000%, particularly greater than 1400%, as determined according to ASTM D638. Tensile modulus at 100% strain is preferably at least 1.8 MPa more preferably at least 2.2 MPa. In general compression set will be less than 35%, especially less than 25%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm). The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark 'Septon' by Kuraray of Japan. The extender liquids employed in the gel preferably comprise oils. The oils may be hydrocarbon oils, for example paraffinic or naphthenic oils, synthectic oils for example polybutene or polypropene oils, and mixtures thereof. The preferred oils are mixtures of non-aromatic paraffins and naphthenic hydrocarbon oils. The gel may contain additives, e.g. such as moisture scavengers (eg. Benzoyl chloride), antioxidants, pigments and fungicides.

Another preferred sealing material is a pressure sensitive adhesive. Further possible sealing materials are reactive gels and water-curable mastics.

The sealing material is preferably covered with a release layer, e.g. release paper, prior to installation. This is particularly preferred for embodiments in which the sealing material has a tacky outer surface (e.g. when it comprises mastic). When the release layers are removed, the sealing material is preferably coated (e.g. sprayed) with a lubricant to facilitate insertion of the device and/or sealing member into the duct.

The sealing member of the kit according to the invention may generally comprise any sealing member suitable for forming a seal in a duct. The sealing member preferably has (at least in use) a convex curved periphery with which it contacts and seals at least part, generally the major part, of the internal wall of the duct. For example, the sealing member may, at least in use, be generally round, e.g. substantially circular, in shape.

The sealing member preferably comprises sealing material, especially around at least part of its periphery which, in use, contacts part of the internal surface of the duct. The sealing material of the sealing member may, for example, be different to the sealing material of the device. Preferably, however, the sealing material of the sealing member is substantially the same as that of the device. Preferred sealing materials are mastics, gels and/or pressure sensitive adhesives (as described above).

In preferred embodiments of the invention, the sealing member is inflatable. The preferred sealing member may generally comprise any inflatable sealing member which can be inflated to form a seal in a duct. Generally any inflating medium may be used, but a preferred such medium is gas, e.g. air, nitrogen or carbon dioxide.

The sealing member is preferably 'wraparound', i.e. open in cross-section so that it can be placed (e.g. wrapped) around one or more cables, pipes or the like which may extend through the duct.

As mentioned above, a particularly preferred inflatable sealing member is that disclosed in International Patent Application No. WO92/19034, namely a flexible hollow sealing member (preferably having substantially non-stretchable walls) that can be inflated to form a seal in a duct (e.g. a duct) and that has a hole directly through a wall or between walls thereof through which hole a probe can be inserted (and from which it can preferably be removed by mere pulling) to introduce a pressurizing medium into the sealing member, and means by which the hole is automatically sealed on withdrawal of the probe. The inflatable sealing member may be supplied with the probe inserted through the hole. Furthermore, insertion of the probe may be part of the manufacturing process of the sealing member.

The specific design of the inflatable sealing member will normally be chosen according to the requirements of each application of the invention. However, designs which incorporate one or both of the following features are generally preferred.

Firstly, an internal flap may, for example, be provided across the hole in or between the walls of the inflatable sealing member. The flap may seal in response to pressure within the member. The flap preferably comprises a flexible polymeric sheet fixed to a wall of the member such that the probe can pass through the hole and displace the flap, the probe preferably passing between the flap and the wall substantially in the plane of the wall (say at less than 45° to that plane). A sealing material, for example a gel or a mastic, may be provided between the flap and the wall, for example as a coating on the flap. The flap may be bonded or welded to the wall along two lines separated by a small gap (say 5–20 mm), such that the probe can be inserted through the hole in the wall and between the wall and the flap generally along the axis of the channel formed between the two bond or weld lines.

The second design is particularly appropriate where the hole is between overlapping walls of a lap join. (The lap join may arise in formation of the member by forming a tube from a sheet of material). The hole, which extends the width of the lap join, may decrease in cross-sectional size toward the outside of the sealing member. The hole may therefore have a funnel, or flattened funnel, shape. A sealing material (preferably a mastic or a gel) may be provided within this funnel-or-other-shaped hole, such that the sealing material is driven by internal pressure to block the hole. The size of the hole and the physical properties and amount of the sealing material may be chosen such that the material does not creep out of the hole to an unacceptable extent. A flap as mentioned above may be used in conjunction with this type of hole.

Inflation of the sealing member may, for example, be carried out by attaching a probe to a source of pressurizing fluid and (if it is not supplied in place) inserting the probe into the sealing member. Generally any suitable pressurizing means may be used to inflate the sealing member, for example, a hand pump, an electric pump, or a pressurized gas cylinder.

According to a third aspect of the invention, there is provided a method of closing a duct having a polygonal internal cross-section by means of a kit of parts according to the second aspect of the invention, comprising:

(a) inserting the device of the kit into the duct; and (b) inserting the sealing member of the kit into the duct;

such that at least some of the sealing material of the device is located, and forms a seal, between the sealing member and an internal surface of the duct at each corner of the polygonal internal cross-section thereof.

The sealing member is preferably inflatable (e.g. as described above) and the method preferably further comprises inflating the sealing member after both the sealing member and the device have been inserted into the duct. In embodiments of the invention in which the sealing material comprises mastic, pressure sensitive adhesive, gel or the like, inflation of the sealing member preferably causes the sealing material to conform to the corners of the duct and to form a seal between the duct and the sealing member. The support of the device is preferably substantially trapped between the duct and the sealing member when the sealing member is inflated.

BRIEF DESCRIPTION OF THE DRAWINGS

The invention will now be described, by way of example, with reference to the accompanying drawings, of which.

DETAILED DESCRIPTION OF THE INVENTION

Figure 1:
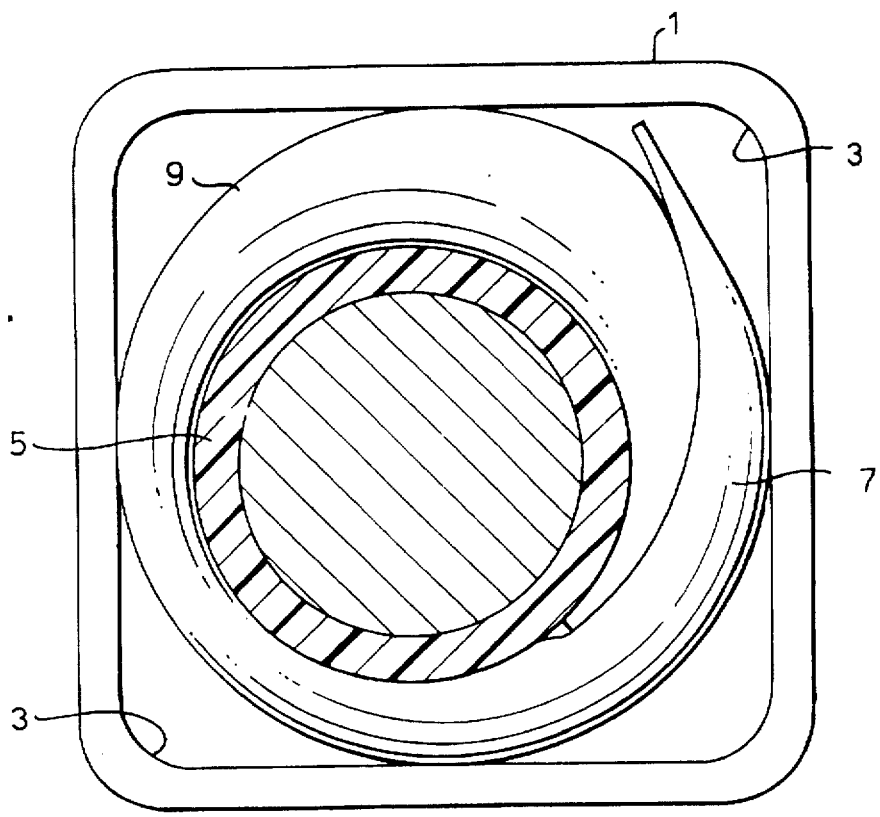
FIG. 1 shows an end view of a square duct containing an inflated sealing member and a cable.

FIG. 1 shows an end view of a duct 1 with a generally square internal cross-section with rounded internal corners 3. The duct 1 contains a cable 5, and wrapped around the cable, an inflated sealing member 7. It can be seen that because the inflated sealing member 7 has been wrapped around the generally circular cross-section cable 5 such that it conforms to the outer surface of the cable, the outer surface 9 of the sealing member 7 is curved, the sealing member itself being approximately circular in cross-section. This means that at each of the four internal corners 3 of the duct there is a gap, i.e. a leak path along which water etc. could flow, between the sealing member 7 and the internal surface of the duct 1.

Figure 2:
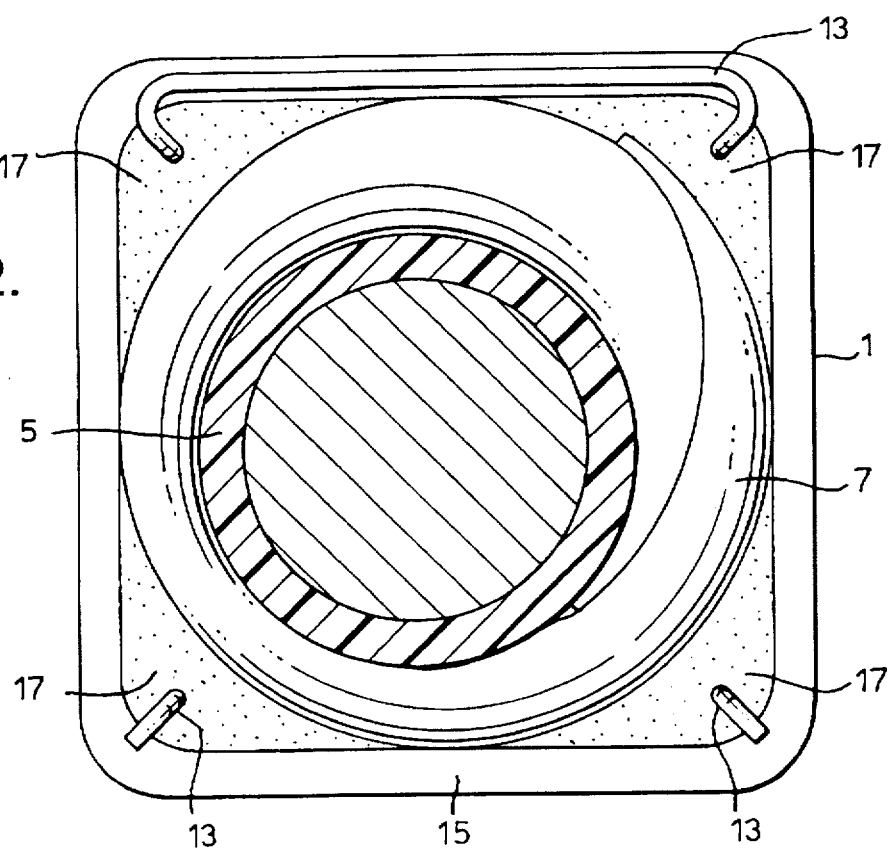
FIG. 2 shows the duct of FIG. 1 containing the inflated sealing member and the cable, and additionally containing a device according to the invention.

FIG. 2 shows the duct of FIG. 1 containing the inflated sealing member 7 and the cable 5, but additionally containing a device according to the invention. End portions of the frame 13 of the device are shown extending out of the duct 1 and abutting an end surface 15 of the duct, thereby substantially preventing the device from moving from the end region of the duct further into the duct. Sealing material (e.g. mastic) 17 provided by the device and located in each of the four internal corners 3 of the duct, has blocked and sealed the leak paths shown in FIG. 1. The preferred sealing material 17 is mastic, and it formed a seal between the sealing member 7 and the internal surface of the duct at each internal corner 3 of the duct when the sealing member was inflated, due to its tackiness and conformability. However, as mentioned above, other sealing materials could be used, e.g. gel.

Figure 3:
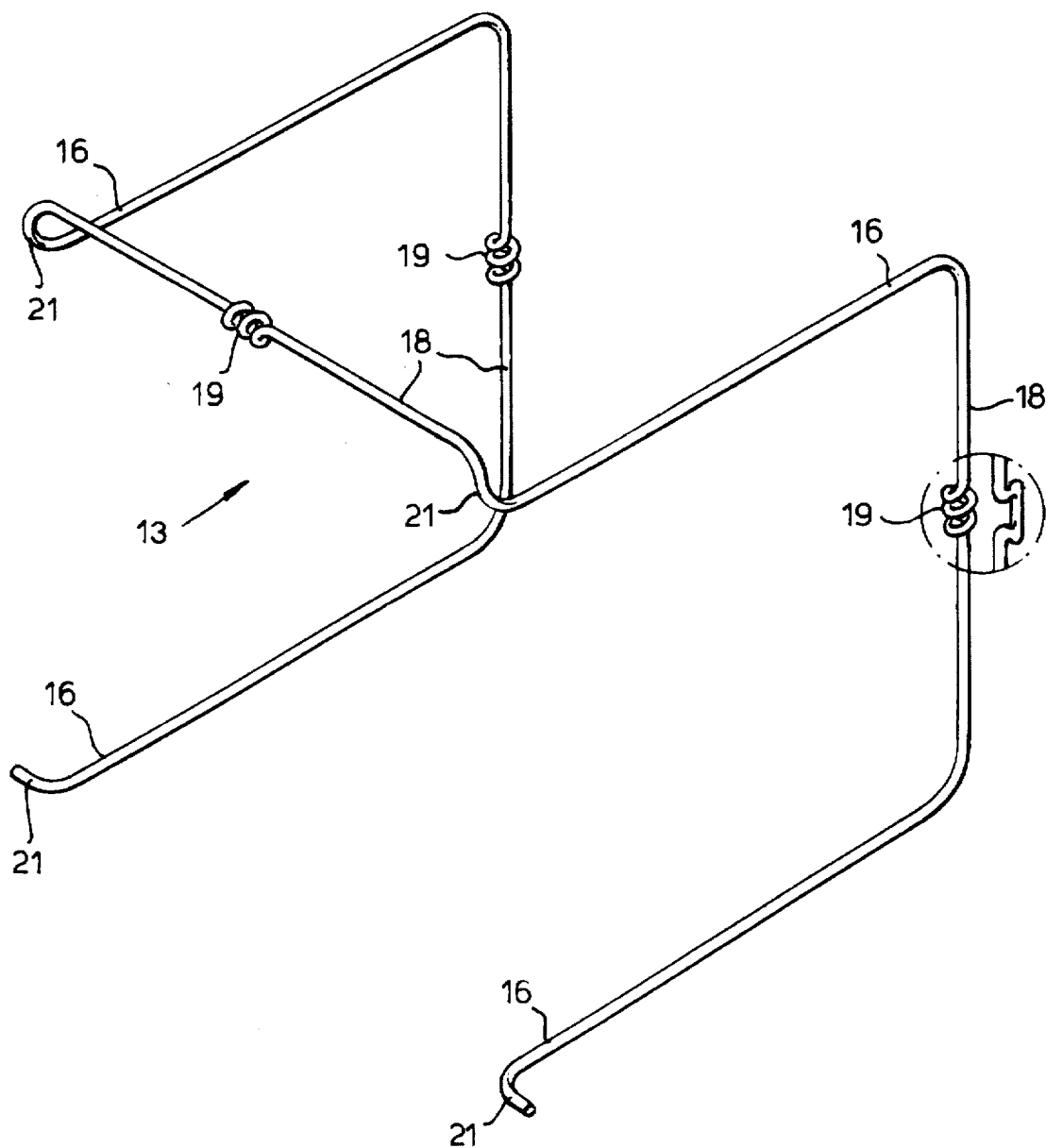
FIG. 3 shows the frame of a device according to the invention.

FIG. 3 shows the support of a device according to the invention in the form of a frame 13. The frame is preferably formed from a single continuous piece of wire, as shown. The frame comprises four arms 16 which extend, in use, longitudinally within a square duct. In the complete device, sealing material (e.g. mastic) is located on each of these four arms 16. Connecting the arms together are three connecting portions 18. In the preferred embodiment shown, each connecting portion 18 has a resiliently compressible section in which the wire of the frame is shaped into a helical spring 19. As mentioned above, this has the advantage of enabling the device to be inserted into, and forming a tight fit with, a range of ducts having differing cross-sectional dimensions. The circled portion of the right hand (as drawn) connecting portion 18 shows an alternative shaping of the frame which also provides resilient compressibility but which is not shaped like a helical spring. Portions 21 of the frame are bent outwardly with respect to the generally square cross-section of the remainder of the frame: these portions are those shown in FIG. 2 abutting an end face of the duct, and are intended to prevent the frame from moving from an end region of the duct where the frame can be reached (and located between the sealing member and the internal surface of the duct) further into the duct, where the frame and sealing member would be less accessible. The portions 21 also have the advantage of providing 'handles' by means of which the frame (and preferably also the sealing member) can be removed from the duct after having been installed. The device can, in this way, facilitate removal of the sealing member (which might otherwise be difficult to remove or require special tools to enable it to be removed). The frame 13 is open in cross-section, to enable it to be positioned around a cable, pipe etc. without requiring access to the end of the cable, pipe etc.

Figure 4:
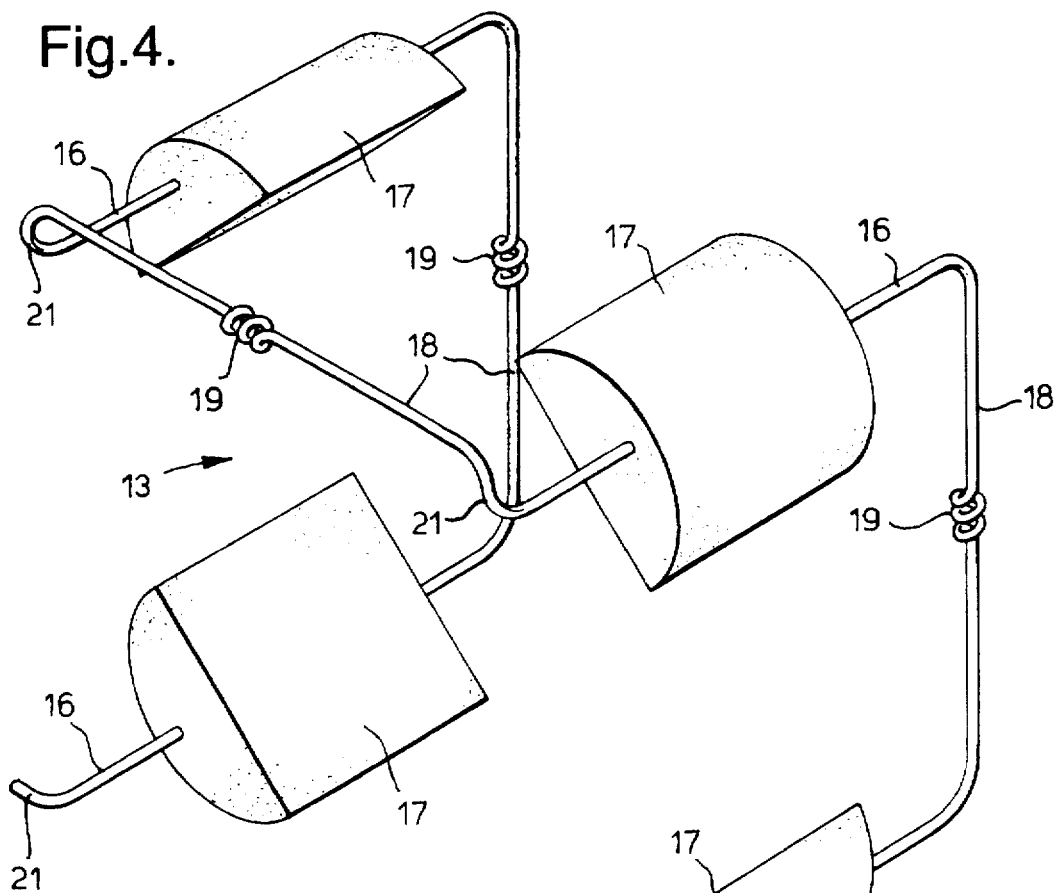
FIG. 4 shows a complete device comprising a frame and four discrete portions of sealing material located on the device.
Figure 5:
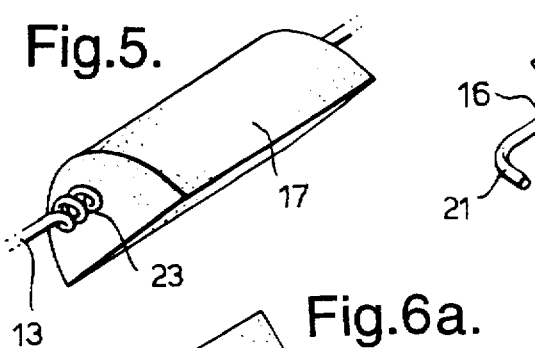
FIG. 5 shows a detail of part of another form of device according to the invention.

FIG. 4 shows a complete device according to the invention, comprising the frame 13 of FIG. 3 and four discrete portions of sealing material 17 (e.g mastic), each located on an arm 16 of the frame. FIG. 5 shows a detail of part of another embodiment of the device according to the invention, in which adjacent to each end of each discrete portion of sealing material, the wire of the frame is shaped to prevent the sealing material portion sliding along the wire and out of its correct position. In FIG. 5, the wire is shaped into a short helical portion 23, but any suitable wire shaping or stop means could be used. The portions of sealing material 17 shown in FIGS. 4 and 5 have a generally semi-circular cylindrical shape. It has been found that this shape is particularly effective for sealing ducts with rounded corners. Other shapes of sealing material portions can be used, depending on the shape of the duct. The sealing material portions are located on the frame such that part of the frame extends through each portion. The portions of sealing material may be formed (especially when comprising mastic) by winding strips of the sealing material around the wire of the frame and then shaping the wound strips. Other methods may, however, be used, e.g. as shown in FIGS. 6a and 6b.

Figure 6A:
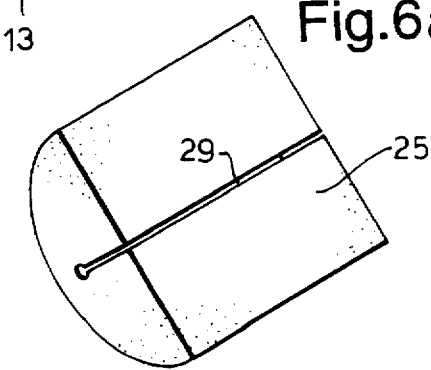
FIGS. 6a and 6b show two portions of sealing material prior to their location on a frame of a device according to the invention.
Figure 6B:
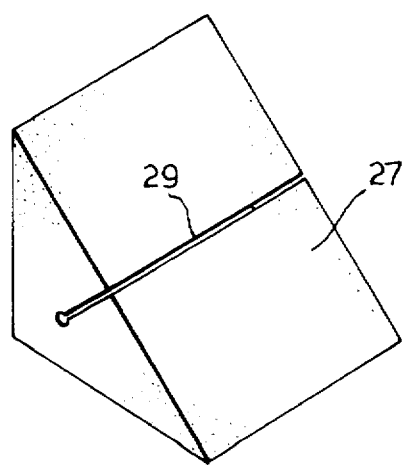

FIGS. 6a and 6b show two shapes of sealing material preform to be located on a frame of a device according to the invention. FIG. 6a shows a preform 25 of generally semi-circular cylindrical shape (e.g. for use with a duct having rounded internal corners) and FIG. 6b shows a preform 27 of generally triangular prismatic shape (e.g. for use with a duct having non-rounded internal corners). Each preform has a longitudinally extending slit 29 to enable it to be clipped over the wire of the frame of a device such that the wire extends through the preform.

Figure 7:
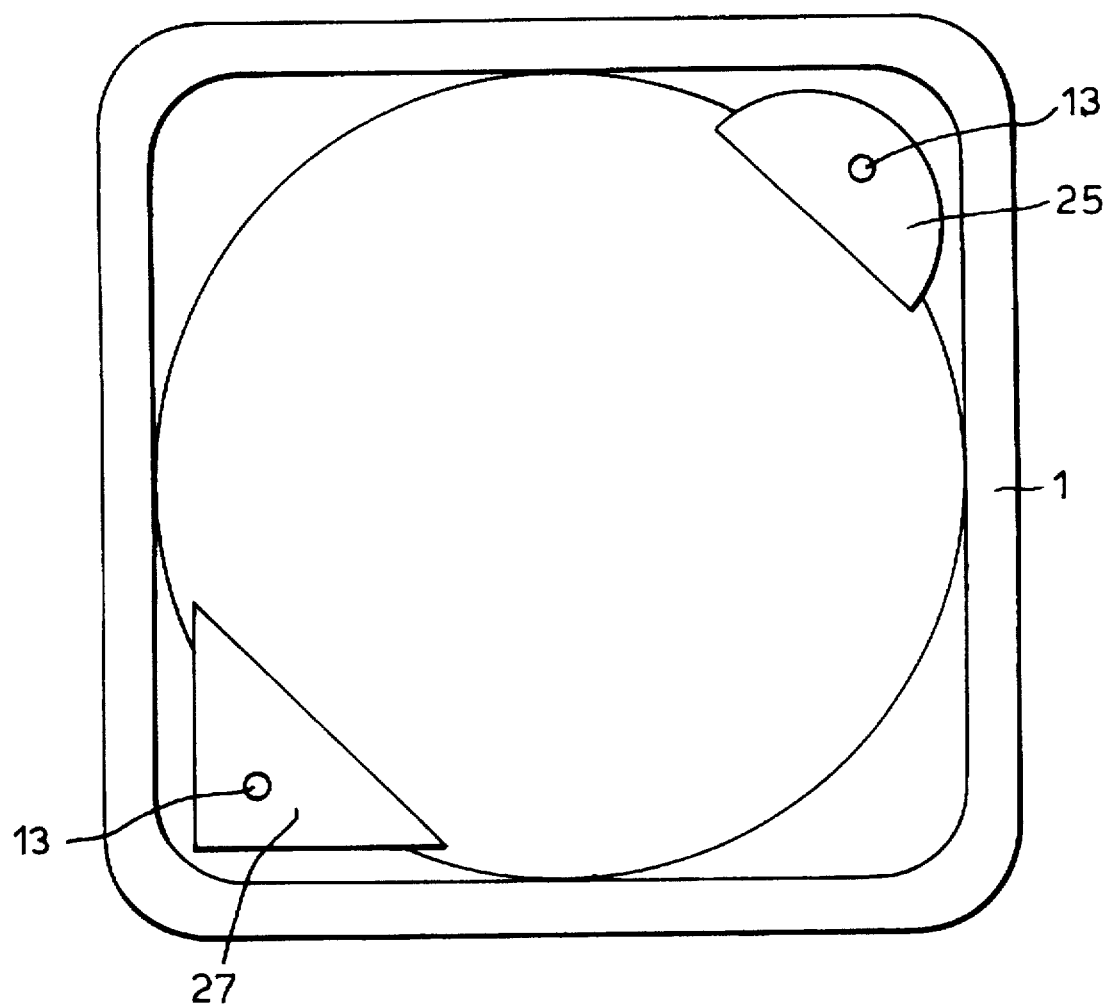
FIG. 7 shows, schematically, the location of the portions of sealing material shown in FIGS. 6a and 6b in respective corners of a square duct.

FIG. 7 shows, schematically, the location of the preforms 25 and 27 of FIGS. 6a and 6b respectively in respective corners of a square duct 1. The wire 7 of a frame 13 and a sealing member 7 are also shown schematically.

Figure 8A:
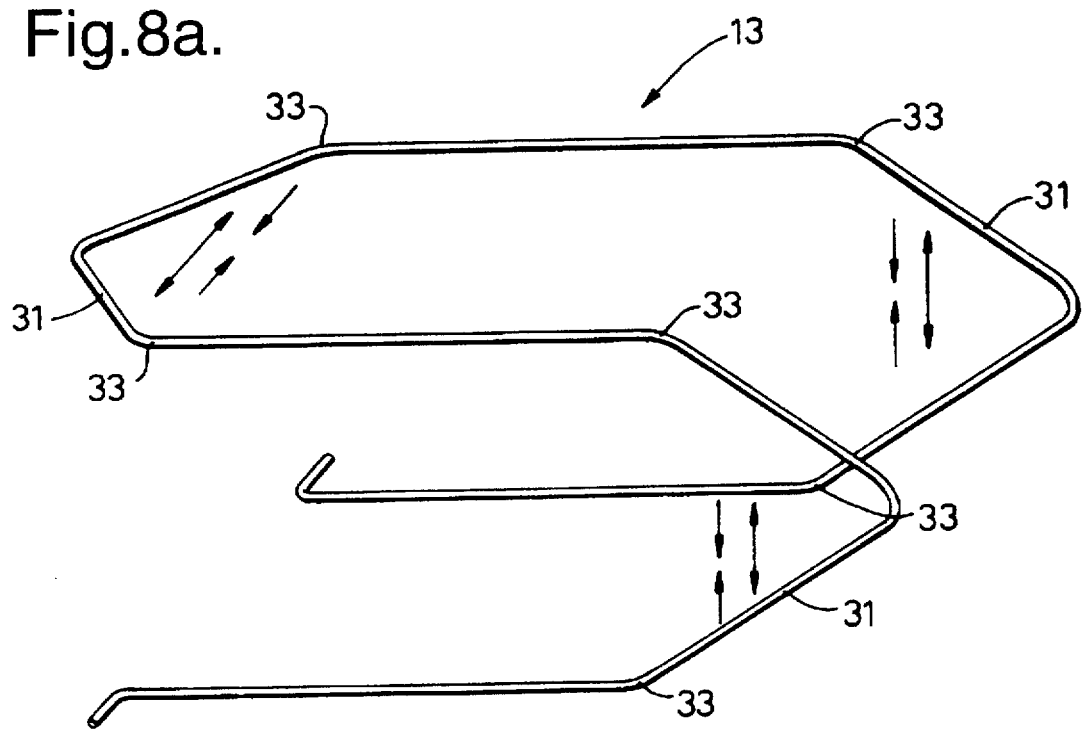
FIGS. 8a and 8b show, respectively, a frame of a device, and a complete device, having angular portions.
Figure 8B:
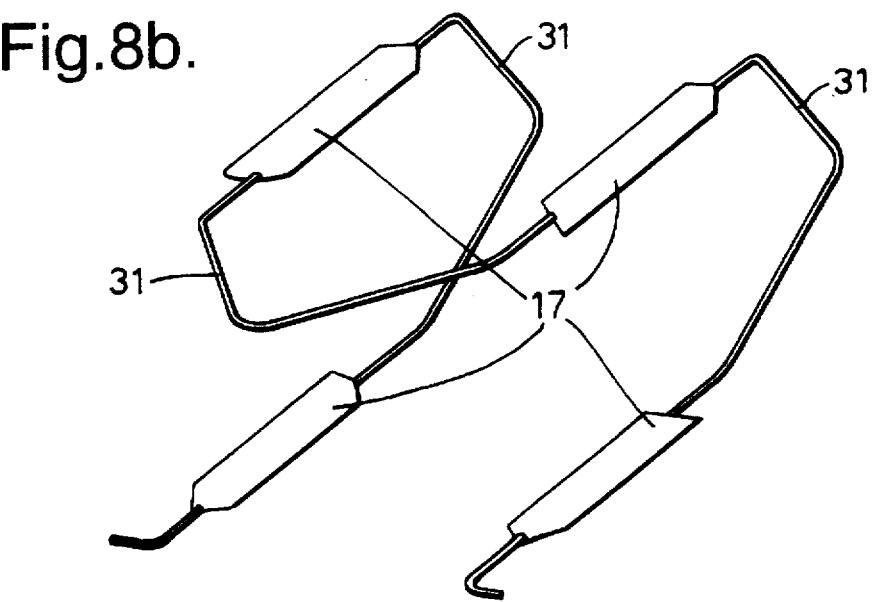

FIGS. 8a and 8b show, respectively, a frame 13 of a device, and a complete device (having sealing material portions 17), having angular frame portions 31 (the equivalent of the connecting portions 18 of FIGS. 3 and 4). These angular frame portions each have a length which is greater than the shortest distance between their ends 33, and can be bent (as indicated by the arrows), preferably by hand, such that the width of the frame, and therefore the device, is increased or decreased. In this way the device is adjustable to fit a range of sizes and/or shapes of duct.

We claim:

1. A kit of parts for closing an end of a duct, the duct having a polygonal internal cross section, the kit comprising:

(a) a sealing member that can be inserted into the duct to form a seal therewith; and (b) a device that can be inserted into the duct to provide sealing material therein, comprising a support and sealing material located on the support;

the support being in the form of a frame which, in use, is located around the sealing member, and which comprises at least three arms which extend, in use, longitudinally within the duct, each arm of the frame carrying a respective discrete portion of sealing material, whereby each discrete portion of sealing material is arranged at a corner of the polygonal internal cross section of the duct such that at least some of the sealing material of the device is located at the corners of a polygon, to form a seal, in use, between the sealing member and an internal surface of the duct at each corner of the polygonal internal cross-section thereof.

2. A kit according to claim 1, in which the polygon has only four corners.

3. A kit according to claim 2, in which the sealing material of the device comprises four discrete portions.

4. A kit according to claim 1, in which the sealing material comprises mastic.

5. A kit according to claim 1, in which the device is open in cross-section to enable the device to be positioned around at least one elongate object extending through the duct without requiring access to an end of said at least one elongate object.

6. A kit according to claim 1, in which the device has one or more portions which, in use, abut an end surface of the duct, thereby substantially preventing the device from moving, in use, from an end region of the duct further into the duct.

7. A kit according to claim 1, in which the device is adjustable to fit a range of of ducts having different sizes and shapes.

8. A kit according to claim 7, in which at least part of the support is bendable, preferably by hand, thereby permitting the support to be bent into the correct size and shape for a particular duct.

9. A kit according to claim 7, in which at least part of the support is resiliently compressible, thereby enabling the device to be inserted into, and form a tight fit with, a range of ducts having differing cross-sectional dimensions.

10. A kit according to claim 7, in which the sealing member is inflatable.

11. A kit according to claim 1, in which the device is adjustable to fit a range of ducts having differing sizes and shapes, and in which at least part of the support is bendable, preferably by hand, thereby permitting the support to bend into the correct size and/or shape for a particular duct and in which at least part of the support is resiliently compressible, thereby enabling the device to be inserted into, and form a tight fit with, a range of ducts having different cross-sectional dimensions.

12. A device for providing sealing material inside a duct, the duct having a polygonal internal cross-section, the device comprising a support and sealing material located on the support, the support being in the form of a frame which comprises at least three arms, which extend, in use, longitudinally within the duct, each arm of the frame carrying a respective discrete portion of sealing material, in order that when the device is inserted into the duct in use, at least some of the sealing material is located at each corner of the polygonal internal cross-section thereof.

13. A method of closing a duct having a polygonal internal cross-section by means of a kit of parts comprising:

(a) inserting a device into the duct to provide sealing material therein, said device comprising a support and sealing material located on the support, the support being in the form of a frame which comprises at least three arms each arm of the frame carrying a respective discrete portion of sealing material; and (b) inserting a sealing member into the duct, so that the frame is located around the sealing member;

such that at least some of the sealing material of the device is located and forms a seal between the sealing member and an internal surface of the duct at each corner of the polygonal internal cross-section thereof.

14. A method according to claim 13, in which the sealing member is inflatable and the method further comprises inflating the sealing member after both the sealing member and the device have been inserted into the duct.

15. The method according to claim 14, in which the sealing material comprises mastic.

* * * * *

UNITED STATES PATENT AND TRADEMARK OFFICE
CERTIFICATE OF CORRECTION

PATENT NO. : 5,741,014
DATED : April 21, 1998
INVENTOR(S) : Wambeke, et al

It is certified that error appears in the above-identified patent and that said Letters Patent is hereby corrected as shown below:

Claim 9, line 1, replace "claim 7" by --claim 1--.

Claim 10, line 1, replace "claim 7" by --claim 1--.

Signed and Sealed this

Thirteenth Day of October 1998

*Attest:*

BRUCE LEHMAN

*Attesting Officer*     *Commissioner of Patents and Trademarks*